US009235604B2

(12) United States Patent
Ma et al.

(10) Patent No.: US 9,235,604 B2
(45) Date of Patent: Jan. 12, 2016

(54) METHOD, APPARATUS AND SYSTEM FOR OBTAINING LOCATION INFORMATION

(71) Applicant: TENCENT TECHNOLOGY (SHENZHEN) COMPANY LIMITED, Shenzhen (CN)

(72) Inventors: Bin Ma, Shenzhen (CN); Mu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/261,972

(22) Filed: Apr. 25, 2014

(65) Prior Publication Data

US 2014/0312113 A1    Oct. 23, 2014

Related U.S. Application Data

(63) Continuation of application No. PCT/CN2014/070368, filed on Jan. 9, 2014.

(30) Foreign Application Priority Data

Apr. 22, 2013    (CN) .......................... 2013 1 0139668

(51) Int. Cl.
*G06F 17/00* (2006.01)
*G06F 17/30* (2006.01)
(52) U.S. Cl.
CPC ................ *G06F 17/30265* (2013.01)
(58) Field of Classification Search
USPC ......................................... 235/375; 345/672
See application file for complete search history.

(56) References Cited

U.S. PATENT DOCUMENTS

| 5,864,125 A    * | 1/1999  | Szabo ........................ 235/384 |
| 2010/0325589 A1* | 12/2010 | Ofek et al. ................... 715/854 |
| 2011/0313779 A1* | 12/2011 | Herzog et al. ............... 705/1.1 |
| 2012/0278171 A1* | 11/2012 | Tang et al. ................. 705/14.57 |
| 2013/0087609 A1  | 4/2013  | Nichol et al. |

FOREIGN PATENT DOCUMENTS

| CN | 102033916 A | 4/2011 |
| CN | 102063652 A | 5/2011 |

OTHER PUBLICATIONS

The World Intellectual Property Organization (WIPO) International Search Report for PCT/CN2014/070368 Apr. 16, 2014.

* cited by examiner

*Primary Examiner* — Ahshik Kim
(74) *Attorney, Agent, or Firm* — Anova Law Group, PLLC

(57) ABSTRACT

A method for obtaining location information is provided. The method includes obtaining street-view image information corresponding to location information and storing correspondingly the street-view image information and the corresponding location information. The method also includes generating a two-dimensional (2D) bar code containing at least one of the street-view image information and the corresponding location information. Further, the method includes scanning the 2D bar code to obtain the at least one of the street-view image information and the location information, where searching the location information based on the street-view image information when the scanning of the 2D bar code obtains the street-view image information and searching the street-view image information based on the location information when the scanning of the 2D bar code obtains the location information.

14 Claims, 4 Drawing Sheets

(a)          (b)

METHOD, APPARATUS AND SYSTEM FOR OBTAINING LOCATION INFORMATION

CROSS-REFERENCES TO RELATED APPLICATIONS

This application is a continuation application of PCT Patent Application No. PCT/CN2014/070368, filed on Jan. 9, 2014, which claims priority of Chinese Patent Application No. 201310139668.X, filed on Apr. 22, 2013, the entire contents of all of which are incorporated by reference herein.

FIELD OF THE INVENTION

The present invention generally relates to two-dimensional (2D) bar code technologies and, more particularly, to methods, apparatuses and systems for obtaining location information.

BACKGROUND

With the arrival of society progresses and the information explosion era, more and more people rely on a wide range of consumer electronic devices (such as a mobile terminal, a personal digital assistant (PDA), etc.) to obtain all kinds of information, such as communicating with others by phones, reading news by browsing the web and checking e-mails, etc. Currently, widely used human-computer interactions include traditional hardware devices, such as keyboards, mouse, and other new hardware devices that are becoming increasingly popular in recent years, such as touch screens.

The Internet and instant messaging technologies play an ever more important role in people's daily life, studying and working. Moreover, with the development of the mobile Internet technologies, the Internet is increasingly mobile. In today's information age, various information devices come into being, for example, landline telephones and mobile phones for voice transmissions, servers and personal computers (PC) for sharing and processing information resources, all kinds of TVs for displaying video data, and so on. These devices are invented to address the actual needs arising in specific fields. With the convergence of consumer electronics, computers, and communication (3C), people are increasingly researching the comprehensive utilization of information equipment of different areas in order to make full use of the existing resources and facilities to better serve people.

In existing technologies, location information is shared mainly through text information, such as business cards, envelopes, member cards, etc. With Location Based Service (LBS) being widely used, location techniques have better implementation methods. But the existing technologies are still mainly based on two-dimensional map locating applications. Users cannot understand exactly street-view and surrounding information of specific locations and cannot develop a large number of applications based on this information. Therefore, the existing information location technical method has certain deficiencies. The amount of information obtained is very limited, and the efficiency is low when sharing location information through text information, such as business cards, envelopes and member cards.

The disclosed method and server are directed to solve one or more problems set forth above and other problems.

BRIEF SUMMARY OF THE DISCLOSURE

One aspect of the present disclosure includes a method for obtaining location information. The method includes obtaining street-view image information corresponding to location information and storing correspondingly the street-view image information and the corresponding location information. The method also includes generating a two-dimensional (2D) bar code containing at least one of the street-view image information and the corresponding location information. Further, the method includes scanning the 2D bar code to obtain the at least one of the street-view image information and the location information, where searching the location information based on the street-view image information when the scanning of the 2D bar code obtains the street-view image information and searching the street-view image information based on the location information when the scanning of the 2D bar code obtains the location information.

Another aspect of the present disclosure includes an apparatus for obtaining location information. The apparatus includes an information storage unit configured to obtain street-view image information corresponding to location information and store correspondingly the street-view image information and the corresponding location information. The apparatus also includes a 2D bar code generating unit configured to generate a two-dimensional (2D) bar code containing at least one of the street-view image information and the corresponding location information. Further, the apparatus includes a location information obtaining unit configured to scan the 2D bar code to obtain the at least one of the street-view image information and the location information, where the location information is searched based on the street-view image information when the scanning of the 2D bar code obtains the street-view image information; and the street-view image information is searched based on the location information when the scanning of the 2D bar code obtains the location information.

Another aspect of the present disclosure includes a system for obtaining location information. The system includes a server configured to obtain street-view image information corresponding to location information and store correspondingly the street-view image information and the corresponding location information, as well as generate a two-dimensional (2D) bar code containing at least one of the street-view image information and the corresponding location information. The system also includes a terminal configured to scan the 2D bar code to obtain the at least one of the street-view image information and the location information, where the location information is searched based on the street-view image information when the scanning of the 2D bar code obtains the street-view image information; and the street-view image information is searched based on the location information when the scanning of the 2D bar code obtains the location information.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present disclosure, the figures which are needed to be used in the description of the present disclosure or the existing technology are briefly described in the following. Obviously, the figures in the following description are only some embodiments of the present disclosure, and it is easily for those skilled in the art to obtain other figures based on the following figures without creative work.

DETAILED DESCRIPTION

Reference will now be made in detail to exemplary embodiments of the disclosure, which are illustrated in the accompanying drawings.

A system for obtaining location information may be implemented on any appropriate computing platform. The location information may be represented by two-dimensional (2D) bar coding. As used herein, a 2D bar code may refer to any appropriate graphical code, including 2D bar, icon, logo, and picture, etc., for identifying location or scene information. For example, a two-dimensional (2D) bar code containing the street-view image information and/or the corresponding location information is generated.

Figure 5:
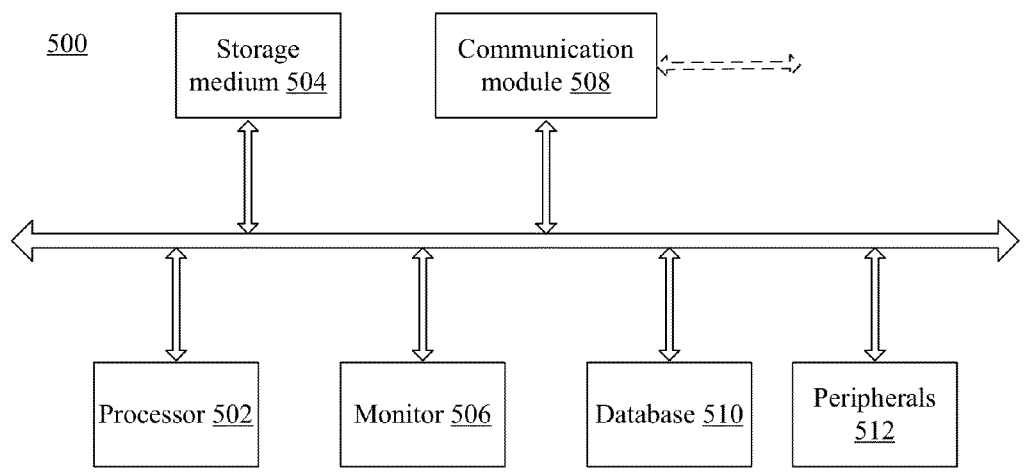
FIG. 5 shows a block diagram of an exemplary computing system according to the disclosed embodiments.

The 2D bar code is scanned to obtain the street-view image information and/or the location information. The system may not only help the user obtain the location information but also assist the user to easily find the path that goes to the location. Moreover, the efficiency of information sharing is improved by combining the street-view image with the 2D bar code. FIG. 5 shows a block diagram of an exemplary computer system 500 capable of implementing the system for obtaining location information.

As shown in FIG. 5, computer system 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices such as keyboard and mouse, and communication module 508 may include network devices for establishing connections through the communication network. Database 510 may include one or more databases for storing certain data and for performing certain operations on the stored data, such as database searching.

Figure 1:
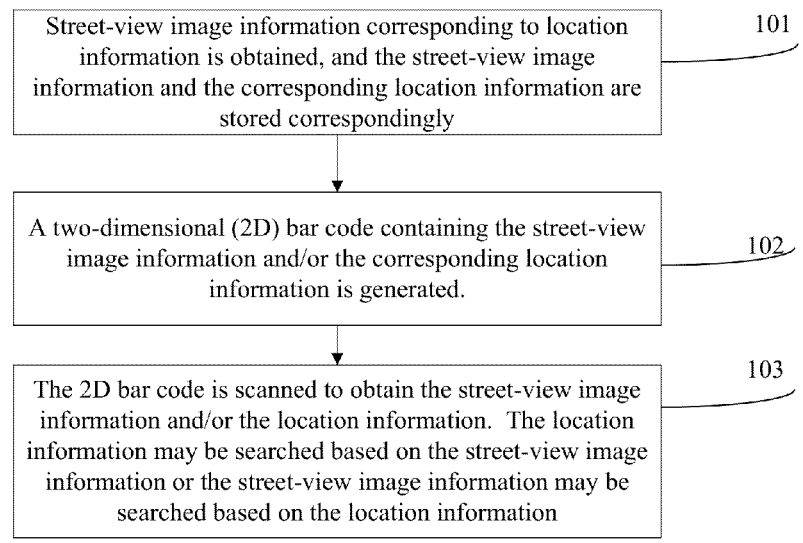
FIG. 1 illustrates a flow chart of an exemplary process for obtaining location information consistent with the disclosed embodiments.

In operation, computer system 500 may run a web browser and perform certain functions for obtaining location information. FIG. 1 illustrates a flow chart of an exemplary process for obtaining location information consistent with the disclosed embodiments.

As shown in FIG. 1, the process for obtaining location information may include the following steps.

Step 101: street-view image information corresponding to location information is obtained, and the street-view image information and the corresponding location information are stored correspondingly.

A street-view image may refer a 360-degree panoramic image of urban streets shot by using professional cameras, and is provided for users by simulating a two-dimensional (2D) flat image into a real three dimensional (3D) image using a specialized player.

Comparing with an ordinary photo, the street-view images have the following features: (1) the street-view images provide users with an immersive experience; (2) the street-view images have geographical location information and can facilitate users to locate positions; and (3) the street-view images are produced in batch along streets, containing a large number of location information. Because of the above features, the street-view is suitable for various applications associated with the location information.

In one embodiment, the street-view image information may be street-view images. In another embodiment, the street-view image information may be the stored identification of the street-view image, that is, a street-view image identifier. The street-view image identifier is used to distinguish among various street-view images. Each street-view image corresponds to the corresponding location information. The corresponding street-view image may be searched through the street-view image identifier, and the location information corresponding to the street-view image is obtained.

In one embodiment, the street-view image corresponding to particular location information can be taken in advance by a user, or the street-view image corresponding to the particular location information can be obtained from a variety of street-view sources. For example, the street-view image of the particular location information can be obtained from a variety of street-view sources via the Internet. Further, a street-view image identifier can be set for each street-view image, and the street-view image and the corresponding location information are stored in a database based on the street-view image identifier.

The location information may refer to one or more specific point of interest (POI) in map applications, and may include the name, category, latitude, and longitude, etc., of the corresponding location.

Step 102: a two-dimensional (2D) bar code containing the street-view image information and/or the corresponding location information is generated.

A two-dimensional (2D) bar code records data symbol information using black and white images of certain geometric shapes distributed within a plane (two-dimensional direction) according to certain rules, such as a rectangular or square box which is made up of black or white square dots or other shapes, such as circles, hexagons, etc. In the code establishment, the 2D bar code uses "0", "1" bit stream concept that constitutes the basis of the computer's internal logic to represent text numerical information by using some geometry corresponding to the binary number. The 2D bar code is automatically read by image input devices or optical scanning devices to achieve automatic information processing.

The 2D barcode can store information in both the horizontal and vertical directions, and thus the 2D barcode can encode greater amount of data and take up smaller space than one-dimensional (1D) barcodes which encode information only in the horizontal direction according to the width of the bars and the spacing. The 2D barcode can store usually up to thousands of characters by comparison to 20 to 25 characters in a 1D barcode.

In the 2D bar code, each symbology has its specific character set and each character occupies a certain width. The 2D bar code also has a self-error correction function along with the characteristics such as the information capacity maximization, code region minimization, and rapid code reading. At the same time, the 2D bar code also can automatically recognize information on different rows and handles graphics rotation changes.

There are many types of 2D barcodes such as Data Matrix, MaxiCode, Aztec, Quick Response Code (QR Code), Vericode, PDF417, Ultracode, Code 49, Code 16K, Han Xin Code, etc.

Figure 6:
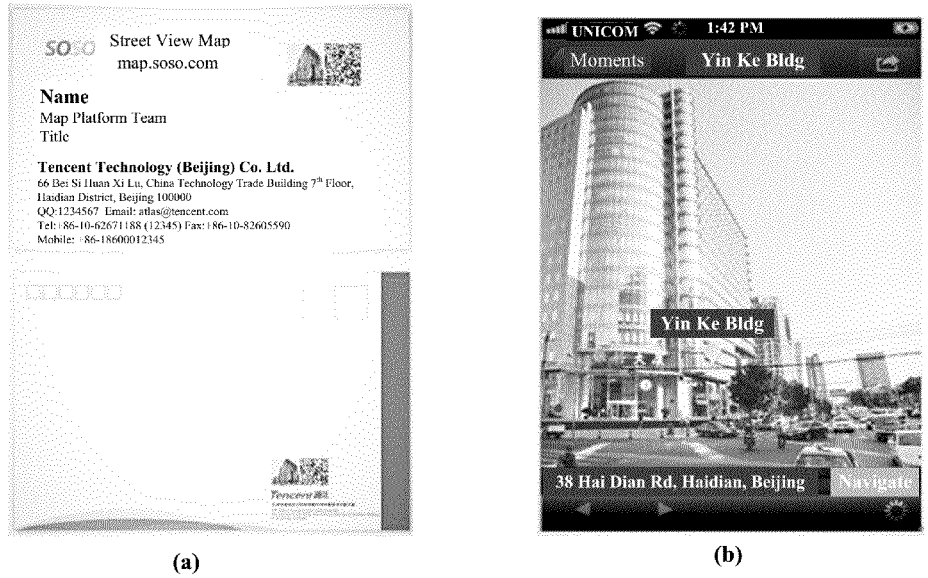
FIG. 6a and FIG. 6b illustrate an exemplary off line application for obtaining location information based on a 2D bar code consistent with the disclosed embodiments.

The 2D bar code may store various types of information including web addresses, business cards, text information, specific codes, etc. Based on information application modes, 2D bar code may include online applications and offline applications. The online application mode may cover a majority of 2D bar code applications (e.g., a web address and specific codes). FIG. 6a and FIG. 6b illustrate an exemplary off line application for obtaining location information based on a 2D bar code consistent with the disclosed embodiments. As shown in FIG. 6a, a business card contains a 2D bar code (in the upper right corner) and other business information (e.g., a giver's name, title, company, and contact information). As shown in FIG. 6b, after scanning the 2D bar code, a street-view image (a building) and text information (e.g., the building's name, address and direction) corresponding to the 2D bar code may be displayed. Thus, the street-view image information and the location information may be obtained by scanning the 2D bar code.

In certain embodiments, the 2D bar code may be generated by various code system and the street-view image information and/or the location information are used as the information stored in the 2D bar code. Specifically, the information stored in the 2D bar code may be any one or more of the street-view image, the street-view image identifier, and the location information.

Step 103: the 2D bar code is scanned to obtain the street-view image information and/or the location information. The location information may be searched based on the street-view image information or the street-view image information may be searched based on the location information.

As used herein, the 2D bar code is scanned to obtain the street-view image information and/or the location information. When only the street-view image information is obtained by scanning the 2D bar code, the location information may be searched based on the street-view image information. In addition, when only the location information is obtained by scanning the 2D bar code, the street-view image information may be searched based on the location information.

In one embodiment, when the information stored in the 2D bar code is the street-view image, the street-view image can be obtained by scanning the 2D bar code and the location information corresponding to the street-view image can be searched based on the street-view image.

In one embodiment, when the information stored in the 2D bar code is the street-view image identifier, the street-view image identifier can be obtained by scanning the 2D bar code and the street-view image corresponding to the street-view image identifier as well as the location information corresponding to the street-view image can be searched based on the street-view image identifier.

In one embodiment, when the information stored in the 2D bar code is the location information, the location information can be obtained by scanning the 2D bar code, and the street-view image corresponding to the location information can be searched based on the location information.

Specifically, the method that generates the 2D bar code containing the street-view image identifier may include: generating a uniform resource locator (URL) that contains the street-view image identifier and the location information of the street-view image, and embedding the URL in the 2D bar code. Further, the method also includes: displaying the street-view image by using the location information of the street-view image.

Specifically, the method that generates the 2D bar code containing the street-view image identifier may include: generating a uniform resource locator (URL) that contains the street-view image identifier and superimposing or additional text information, and embedding the URL in the 2D bar code. Further, the method also includes: displaying the street-view image, and also displaying the superimposing or additional text information on the street-view image.

In one embodiment, obtaining street-view image information and/or location information by scanning the 2D bar code may further include the followings.

Detecting a 2D bar code image in a camera video frame image to obtain a 2D bar code contour or outline, and recognizing the corresponding 2D bar code from the detected 2D bar code contour to obtain the street-view image information and/or the location information.

The camera video frame refers to image data contained in each frame of the video that is obtained from the video camera scanning the 2D bar code.

Specifically, in the camera video frame image, detecting the 2D bar code to obtain 2D bar code outline may include the following steps:

The camera video frame image is converted to a grayscale image, and the grayscale image is converted to a binary image.

A horizontal anchor feature scan and a vertical anchor feature scan are performed on the binary image to obtain a horizontal anchor feature line and a vertical anchor feature line.

An intersection of the horizontal anchor feature line and the vertical anchor feature line is calculated to obtain an anchor position of the 2D bar code. The 2D bar code contour or outline is then determined according to the calculated anchor position of the 2D bar code.

In one embodiment, the method may further include: when the 2D bar code is not detected in the camera video frame image, a down-sampling process is performed. After performing the down-sampling process, the 2D bar code is detected again in the camera video frame image.

For example, if the 2D bar code cannot be detected in the input camera video frame image, the down-sampling process is performed using a ratio of 0.5. After down-sampling, the 2D bar code is detected again from the camera video frame image. If the 2D bar code is still not detected, the down-sampling process is performed again using the ratio of 0.5. The down-sampling process may be repeated three times. If the 2D bar code cannot be detected after repeating the down-sampling process for three times, it may be considered that the 2D bar code is not detected. In this process, according to the actual situation, different down-sampling ratios, such as 0.5, 0.6, 0.7, or 0.8, may be used.

In one embodiment, the location information to be queried is further received and whether the location information to be queried is stored in the database in Step 101 is determined. If the location information to be queried is stored in the database, the location information to be queried is searched. If the location information to be queried is not stored in the database, the location information to be queried is stored, the street-view image corresponding to the location information to be queried is obtained, and the street-view image identifier is generated. Based on the street-view image identifier, the street-view image and the corresponding location information to be queried are stored correspondingly.

In one embodiment, after searching and obtaining the street-view image information and the corresponding location information, based on the location information, a navigation path is further calculated. The navigation path and the street-view image are displayed, thereby assisting the user to finally confirm the navigation path. For example, a navigation path and a street-view image of a final destination are displayed, thereby assisting a user to confirm the driving direction to the destination. The navigation path and the street-view images of several intermediate points of the navigation path can also be displayed, thus helping the user to confirm correct driving directions. Optionally, the navigate path or the related auxiliary text is displayed overlaying on the street-view image through a mask layer. Other methods may also be used.

In Step 102, the uniform resource locator (URL) containing the street-view image identifier, the location information of the street-view image and the additional text information is generated and embedded in the 2D bar code.

At this time, the URL is obtained by scanning the 2D bar code, and the obtained URL is parsed to obtain the street-view image identifier, the location information of the street-view image and the additional text information. Based on the street-view image identifier, the street-view image and the corresponding location information are searched. The street-view image information is displayed by using the location information of the street-view image, and the additional text information is also presented in the street-view image.

In addition, the webpage corresponding to the URL may be directly accessed by a browser. The webpage contains the street-view image corresponding to the street-view image identifier. The street-view image is displayed in the webpage by using the location information of the street-view image and the additional text information is presented in the street-view image.

Thus, the street-view image information associated with the location information is displayed by using the location information of the street-view image. The method may not only help the user obtain the location information but also assist the user to easily find the path that goes to the location. Moreover, the efficiency of information sharing is improved by combining the street-view image with the 2D bar code.

Base on the above description in details, an apparatus for obtaining location information is also provided.

Figure 2:
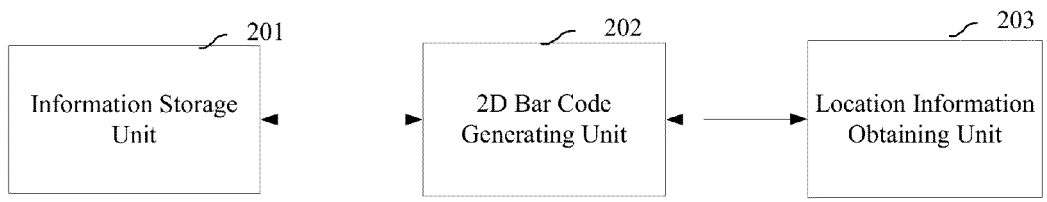
FIG. 2 illustrates a structure diagram of an exemplary apparatus for obtaining location information consistent with the disclosed embodiments.

FIG. 2 illustrates a structure diagram of an exemplary apparatus for obtaining location information consistent with the disclosed embodiments. As shown in FIG. 2, the apparatus for obtaining location information may include an information storage unit 201, a 2D bar code generating unit 202 and a location information obtaining unit 203.

The information storage unit 201 is configured to obtain street-view image information corresponding to location information and store correspondingly the street-view image information and the corresponding location information.

The 2D bar code generating unit 202 is configured to generate a two-dimensional (2D) bar code containing the street-view image information and/or the corresponding location information.

The location information obtaining unit 203 is configured to scan the 2D bar code to obtain the street-view image information and/or the location information and search the location information based on the street-view image information or search the street-view image information based on the location information.

In one embodiment, the 2D bar code generating unit 202 is configured to generate a 2D bar code containing the street-view image.

The location information obtaining unit 203 is configured to scan the 2D bar code to obtain the street-view image and search the location information corresponding to the street-view image.

In one embodiment, the 2D bar code generating unit 202 is configured to generate a 2D bar code containing the street-view image identifier.

The location information obtaining unit 203 is configured to scan the 2D bar code to obtain the street-view image identifier, search the street-view image corresponding to the street-view image identifier, and search the location information corresponding to the street-view image.

In one embodiment, the 2D bar code generating unit 202 is configured to generate a 2D bar code containing the location information.

The location information obtaining unit 203 is configured to scan the 2D bar code to obtain the location information, as well as search the street-view image corresponding to the location information.

In one embodiment, the location information obtaining unit 203 is configured to detect a 2D bar code in a camera video frame image to obtain the 2D bar code outline and identify the 2D bar code of the detected 2D bar code outline to obtain the street-view image information and/or location information.

In one embodiment, the location information obtaining unit 203 is configured to convert the camera video frame image to a grayscale image and convert the grayscale image to a binary image. The location information obtaining unit 203 is also configured to scan the binary image by a horizontal anchor feature and a vertical anchor feature to obtain a horizontal anchor feature line and a vertical anchor feature line. The location information obtaining unit 203 is also configured to calculate an intersection of the horizontal anchor feature line and the vertical anchor feature line to obtain the anchor position of the 2D bar code, as well as obtain the 2D bar code outline according to the anchor position of the calculated 2D bar code.

In one embodiment, the location information obtaining unit 203 is further configured to, after searching and obtaining the street-view image and the corresponding location information, based on the location information, calculate a navigation path and display the navigation path and the street-view image.

In one embodiment, the information storage unit 201 is further configured to receive the location information to be queried and determine whether the location information to be queried is stored. If the location information to be queried is stored, the location information to be queried is searched; if the location information to be queried is not stored, the location information to be queried is stored, and the street-view image corresponding to the location information to be queried is obtained to generate the street-view image identifier. Based on the street-view image identifier, the street-view image and the corresponding location information to be queried are stored correspondingly.

In one embodiment, the 2D bar code generating unit 202 is configured to generate a URL containing the street-view image identifier, the location information of the street-view image and the additional text information and embed the URL in the 2D bar code.

The location information obtaining unit 203 is configured to search the street-view image based on the street-view image identifier, display the street-view image by using the location information of the street-view image, as well as present the additional text information in the street-view image.

Based on the above description in details, a system for obtaining location information is also provided.

Figure 3:
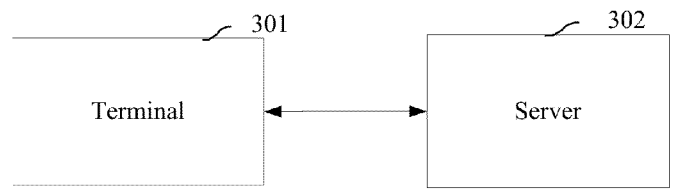
FIG. 3 illustrates a structure diagram of an exemplary system for obtaining location information consistent with the disclosed embodiments.

FIG. 3 illustrates a structure diagram of an exemplary system for obtaining location information consistent with the disclosed embodiments. As shown in FIG. 3, the system for obtaining location information may include a terminal 301 and a server 302. Although only one server 302 and one terminal 301 is shown in FIG. 3, any number of terminals 301 or servers 302 may be included, and other devices may also be included. The terminal may include any appropriate device such as a personal computer, a notebook computer, a smart phone, a tablet, or any other computing device, and the server may include any appropriate computing system providing server functionalities.

A server 302, as used herein, may refer one or more server computers configured to provide certain web server functionalities to obtain street-view image information corresponding to location information, which may store correspondingly the street-view image information and the corresponding location information. A server may also include one or more processors to execute computer programs in parallel.

The server 302 is configured to obtain street-view image information corresponding to location information and store correspondingly the street-view image information and the corresponding location information, as well as generate a 2D bar code containing the street-view image information and/or the corresponding location information.

A terminal 301, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 301 may be a wireless terminal, such as a smart phone, a tablet computer, or a mobile phone, etc. Terminal 301 may be implemented on any appropriate computing platform.

The terminal 301 is configured to scan the 2D bar code to obtain the street-view image information and/or the location information, and search the location information based on the street-view image information or search the street-view image information based on the location information.

In one embodiment, the server 302 is configured to generate a 2D bar code containing the street-view image.

The terminal 301 is configured to scan the 2D bar code to obtain the street-view image and search the location information corresponding to the street-view image.

In one embodiment, the server 302 is configured to generate a 2D bar code containing the street-view image identifier.

The terminal 301 is configured to scan the 2D bar code to obtain the street-view image identifier, as well as search the street-view image corresponding to the street-view image identifier and the location information corresponding to the street-view image.

In one embodiment, the server 302 is configured to generate a 2D bar code containing the location information.

The terminal 301 is configured to scan the 2D bar code to obtain the location information, as well as search the street-view image corresponding to the location information.

In one embodiment, the server 302 is configured to, after the terminal 301 searches and obtains the street-view image and the corresponding location information, based on the location information, calculate a navigation path.

The terminal 301 is configured to display the navigation path and the street-view image.

In one embodiment, the server 302 is configured to generate a URL containing the street-view image identifier, the location information of the street-view image and the additional text information and embed the URL in the 2D bar code.

The terminal 301 is configured to scan the 2D bar code to obtain the URL and parse the URL to obtain the street-view image identifier, the location information of the street-view image and the additional text information. The terminal 301 is also configured to, based on the street-view image identifier, search the street-view image and the corresponding location information and display the street-view image by using the location information of the street-view image, as well as present the additional text information in the street-view image information.

The terminal 301 can be integrated into various networking hardware, such as a mobile phone, a Personal Digital Assistant (PDA), a personal computer (PC), a tablet, etc.

The server 302 can also be integrated into various networking hardware, such as a map information server, a location information server, etc.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

The embodiments disclosed can be applied to a variety of specific applications associated with location information, such as street-view map applications.

Figure 4:
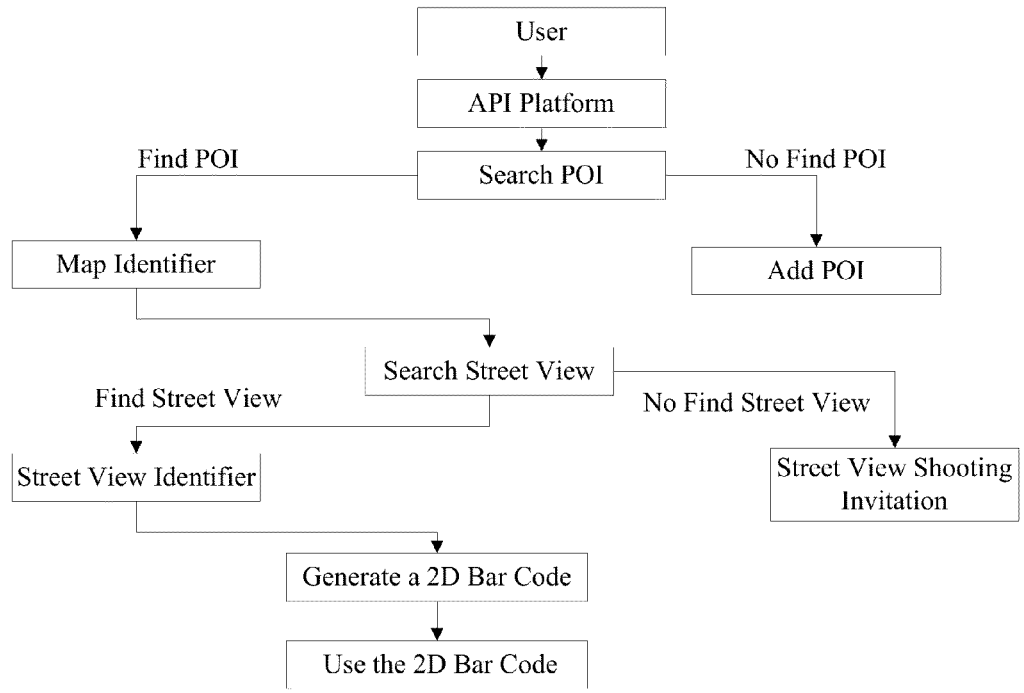
FIG. 4 illustrates a flow diagram for obtaining location information based on a 2D bar code consistent with the disclosed embodiments.

FIG. 4 illustrates a flow diagram for obtaining location information based on a 2D bar code consistent with the disclosed embodiments. As shown in FIG. 4, an open application programming interface (API) platform is provided in a street-view map application. When a user searches his/her own location information (e.g., point of interest or POI), the API platform automatically generates a unique map location identifier corresponding to the user's POI. The user's actual location information can be accurately located by the map location identifier.

If a user cannot find his/her location information, the user can apply for adding the POI. After the POI is successfully added, the above operations are performed again. Every POI includes at least the following information: a name, a category, longitude, latitude, and so on.

After completing the match of the map location identifier, the user finds a street-view collection point corresponding to the map location identifier. After selecting the best joint point and a street-view display angle, a corresponding relationship between the map location identifier and the street-view collection point identifier is created. If the user's POI does not include street-view collection information, a street-view photo shooting invitation of the corresponding location is requested in the API platform. After adding the new street-view data, the above matching operation is performed.

Figure 7:
FIG. 7 illustrates an exemplary corresponding relationship created between a map location identifier and a street-view collection point identifier consistent with the disclosed embodiments.

FIG. 7 illustrates an exemplary corresponding relationship created between a map location identifier and a street-view collection point identifier consistent with the disclosed embodiments. As shown in FIG. 7, when a user finds a street-view collection point corresponding to a map location identifier, the user may select the best joint point and a street-view display angle and create a corresponding relationship between the map location identifier and the street-view collection point identifier.

After the relationship between the map location identifier and the street-view collection point identifier is created successfully, the API platform may provide the user with the 2D bar code product that can be downloaded to use. The user can promote the product through any promoting or sharing channel.

Figure 8:
FIG. 8 illustrates an exemplary generated 2D bar code product consistent with the disclosed embodiments.

FIG. 8 illustrates an exemplary generated 2D bar code product consistent with the disclosed embodiments. As shown in FIG. 8, a URL containing the street-view image identifier (i.e., http://map.soso.com/?l=90486103), the location information of the street-view image and the additional text information is generated and embedded in a 2D bar code in the upper right corner of FIG. 8. A user may scan the 2D bar code to obtain the URL using his/her mobile phone. Then, the URL is parsed to obtain the street-view image identifier, the location information of the street-view image and the additional text information. Based on the street-view image identifier, the street-view image and the corresponding location information are searched. The street-view image information is displayed by using the location information of the street-view image and the additional text information is presented in the street-view image. On the one hand, a convenient location information sharing way is provided for users. On the other hand, users can timely find out actual street-view and surroundings.

Further, there are various forms to implement the method, apparatus and system for obtaining the location information based on the two-dimensional bar code.

For example, based on a standardized application program interface, the method for obtaining the location information based on the two-dimensional bar code may be implemented by a plug-in that is installed in a browser or a packaged application that can be downloaded by a user. The plug-in can be written and implemented by file types, such as Dynamic Link Library (DLL), Object Linking and Embedding Control Extension (OCX), cabinet (CAB), etc. The method, apparatus and system for obtaining the location information based on the two-dimensional bar code can also be implemented by Flash plugin, RealPlayer plug-in, MMS plug, MI stave plugin, ActiveX plug-in technology.

The user may scan a 2D bar code to obtain location information by various terminals. The terminals may include but be not limited to a feature phone, a smart phone, a personal computer (PC), a tablet, or a personal digital assistant (PDA), etc.

The browsers may include Microsoft Internet Explorer, Mozilla Firefox, Apple Safari, Opera, Google Chrome browser, GreenBrowser, etc. The implementation is not limited to the above browsers, but the implementation may be applied to any application that can be used to display web servers or files with the file systems and allow the user to interact with files. The application can be various common browsers or any other application with a web browsing function.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed method, apparatus and system for obtaining location information, street-view image information corresponding to location information is obtained. The street-view image information and the corresponding location information are stored correspondingly. A 2D bar code containing the street-view image information and/or the corresponding location information is generated. The 2D bar code is scanned to obtain the street-view image information and search the location information based on the street-view image information, as well as the 2D bar code is scanned to obtain the location information and search the street-view image information based on the location information. Thus, after implementation of the present disclosure, the street-view image information and the location information are combined with 2D bar code, a convenient location information sharing way is provided for users. In addition, the efficiency of location information sharing is improved.

What is claimed is:

1. A method for obtaining location information, comprising:
    obtaining street-view image information corresponding to location information;
    storing correspondingly the street-view image information and the corresponding location information;
    generating a two-dimensional (2D) bar code containing at least one of the street-view image information and the corresponding location information;
    scanning the 2D bar code to obtain the at least one of the street-view image information and the location information;
    when the scanning of the 2D bar code obtains the street-view image information, searching the location information based on the street-view image information; and
    when the scanning of the 2D bar code obtains the location information, searching the street-view image information based on the location information.

2. The method according to claim 1, wherein the 2D bar code is generated to contain a street-view image identifier, and the scanning and searching further includes:
    scanning the 2D bar code to obtain the street-view image identifier; and
    searching a street-view image corresponding to the street-view image identifier and the location information corresponding to the street-view image.

3. The method according to claim 2, wherein generating the 2D bar code containing the street-view image identifier further includes:

generating a uniform resource locator (URL) containing the street-view image identifier and the location information of the street-view image;
embedding the URL in the 2D bar code; and
displaying the street-view image by using the location information of the street-view image.

4. The method according to claim 2, wherein generating the 2D bar code containing the street-view image identifier further includes:
generating a uniform resource locator (URL) containing the street-view image identifier and additional text information;
embedding the URL in the 2D bar code; and
displaying the street-view image and presenting the additional text information in the street-view image.

5. The method according to claim 1, wherein scanning the 2D bar code further includes:
detecting the 2D bar code in a camera video frame image to obtain an outline of a 2D bar code; and
recognizing the 2D bar code enclosed by the detected outline to obtain the at least one of the street-view image information and the location information.

6. The method according to claim 5, wherein detecting the 2D bar code in a camera video frame image to obtain the outline of the 2D bar code further includes:
converting the camera video frame image to a grayscale image, and converting the grayscale image to a binary image;
performing a horizontal anchor feature scan and a vertical anchor feature scan on the binary image to obtain a horizontal anchor feature line and a vertical anchor feature line;
calculating an intersection of the horizontal anchor feature line and the vertical anchor feature line to determine an anchor position of the 2D bar code; and
according to the determined anchor position of the 2D bar code, obtaining the outline of the 2D bar code.

7. The method according to claim 1, further including:
after searching and obtaining the street-view image information and the corresponding location information, based on the location information, calculating a navigation path and displaying the navigation path and the street-view image.

8. The method according to claim 1, further including:
receiving the location information to be queried and determining whether the location information to be queried is stored;
when the location information to be queried is stored, searching the location information to be queried; and
when the location information to be queried is not stored, storing the location information to be queried.

9. The method according to claim 8, further including:
obtaining the street-view image corresponding to the location information to be queried;
generating the street-view image identifier; and
based on the street-view image identifier, storing correspondingly the street-view image and the corresponding location information to be queried.

10. An apparatus for obtaining location information, comprising:
an information storage unit configured to obtain street-view image information corresponding to location information and store correspondingly the street-view image information and the corresponding location information;
a 2D bar code generating unit configured to generate a two-dimensional (2D) bar code containing at least one of the street-view image information and the corresponding location information; and
a location information obtaining unit configured to scan the 2D bar code to obtain the at least one of the street-view image information and the location information, wherein:
when the scanning of the 2D bar code obtains the street-view image information, the location information is searched based on the street-view image information; and
when the scanning of the 2D bar code obtains the location information, the street-view image information is searched based on the location information.

11. The apparatus according to claim 10, wherein:
the 2D bar code generating unit is configured to generate a 2D bar code containing a street-view image identifier; and
the location information obtaining unit is configured to scan the 2D bar code to obtain the street-view image identifier, and search a street-view image corresponding to the street-view image identifier and the location information corresponding to the street-view image.

12. The apparatus according to claim 10, wherein:
the information storage unit is further configured to receive the location information to be queried and determine whether the location information to be queried is stored;
when the location information to be queried is stored, the location information to be queried is searched;
when the location information to be queried is not stored, the location information to be queried is stored, and a street-view image corresponding to the location information to be queried is obtained to generate the street-view image identifier; and
based on the street-view image identifier, the street-view image and the corresponding location information to be queried are stored correspondingly.

13. A system for obtaining location information, comprising:
a server configured to:
obtain street-view image information corresponding to location information and store correspondingly the street-view image information and the corresponding location information; and
generate a two-dimensional (2D) bar code containing at least one of the street-view image information and the corresponding location information; and
a terminal configured to scan the 2D bar code to obtain the at least one of the street-view image information and the location information, wherein:
when the scanning of the 2D bar code obtains the street-view image information, the location information is searched based on the street-view image information; and
when the scanning of the 2D bar code obtains the location information, the street-view image information is searched based on the location information.

14. The system according to claim 13, wherein:
the server is configured to generate a 2D bar code containing a street-view image identifier; and
the terminal is configured to scan the 2D bar code to obtain the street-view image identifier and search a street-view image corresponding to the street-view image identifier and the location information corresponding to the street-view image.

* * * * *